Aug. 7, 1956
P. DE LA MOTTE
2,757,880
COIL CRADLE
Filed Oct. 22, 1953
5 Sheets-Sheet 1
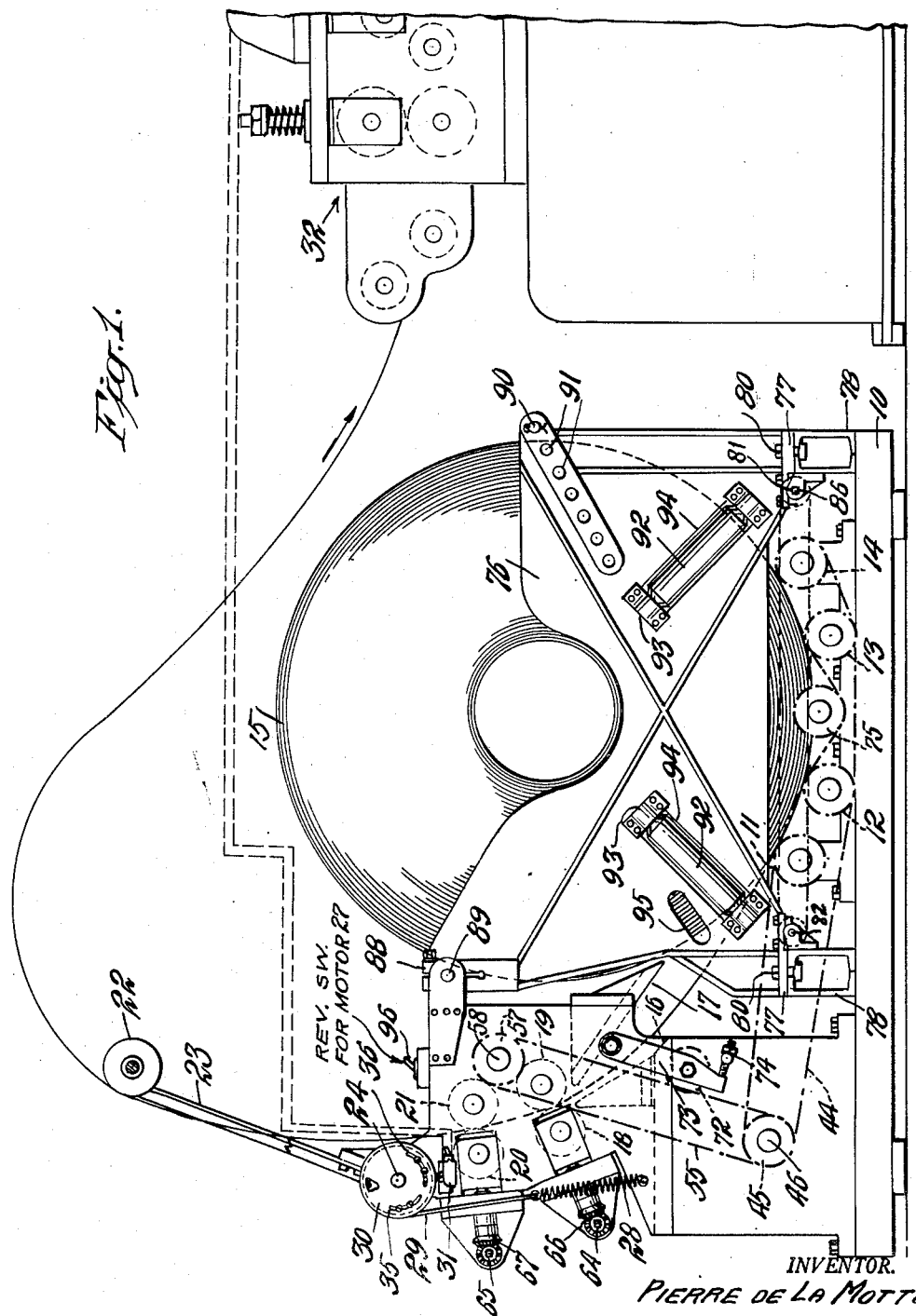
Fig.1.
INVENTOR.
PIERRE DE LA MOTTE
BY
ATTORNEY Aug. 7, 1956 — P. DE LA MOTTE — 2,757,880
COIL CRADLE Filed Oct. 22, 1953 — 5 Sheets-Sheet 4

INVENTOR.
PIERRE DE LA MOTTE
BY
*Philip S. ...*
ATTORNEY

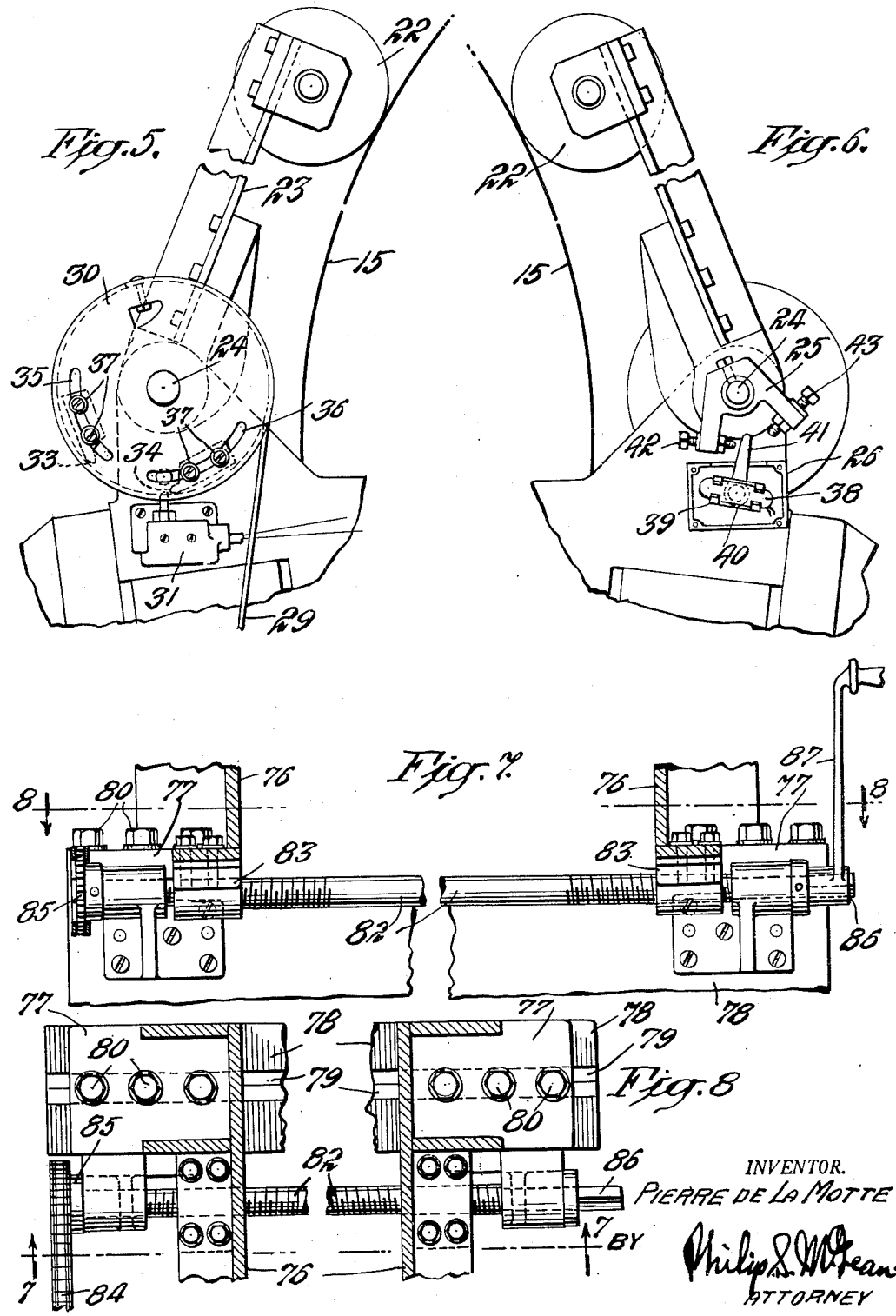

2,757,880
Patented Aug. 7, 1956

2,757,880
COIL CRADLE

Pierre De La Motte, Nutley, N. J., assignor to U. S. Tool Company, Inc., Ampere, N. J., a corporation of New Jersey Application October 22, 1953, Serial No. 387,722

2 Claims. (Cl. 242—78)

The invention here disclosed relates to coil cradles and particularly those for handling heavy coils of wide strip stock.

Objects of the invention are to provide improved mechanism for supporting and rotating the heavy coils without damaging or marking the strip material, and for withdrawing this wide material from the coil and feeding it smoothly and evenly into a straightener or other machine with which the cradle may be associated.

Particular objects of the invention also are to facilitate the separation of the outer convolution from the body of the coil and to effect proper guidance and direction of this outer convolution away from the coil.

Special objects of the invention also are to facilitate proper adjustment of the strip guiding and feeding means and adjustment of the control mechanism to suit stock of different thickness, stiffness and other characteristics.

Other special objects of the invention are to provide a machine of the character indicated in a simple, practical design and generally suited to present day heavy duty manufacturing requirements.

Other desirable objects attained by the invention and the novel features of construction, combination and relation of parts constituting the invention are set forth or will appear in the course of the specification.

The drawings accompanying and forming part of the specification illustrate a present commercial embodiment of the invention. Structure, however, may be modified and changed as regards the immediate illustration, all within the true intent and scope of the invention as hereinafter defined and claimed.

Fig. 1 in the drawings is a side elevation of one of the cradles associated with and feeding stock to a straightener, the latter only partly shown;

Figure 2:
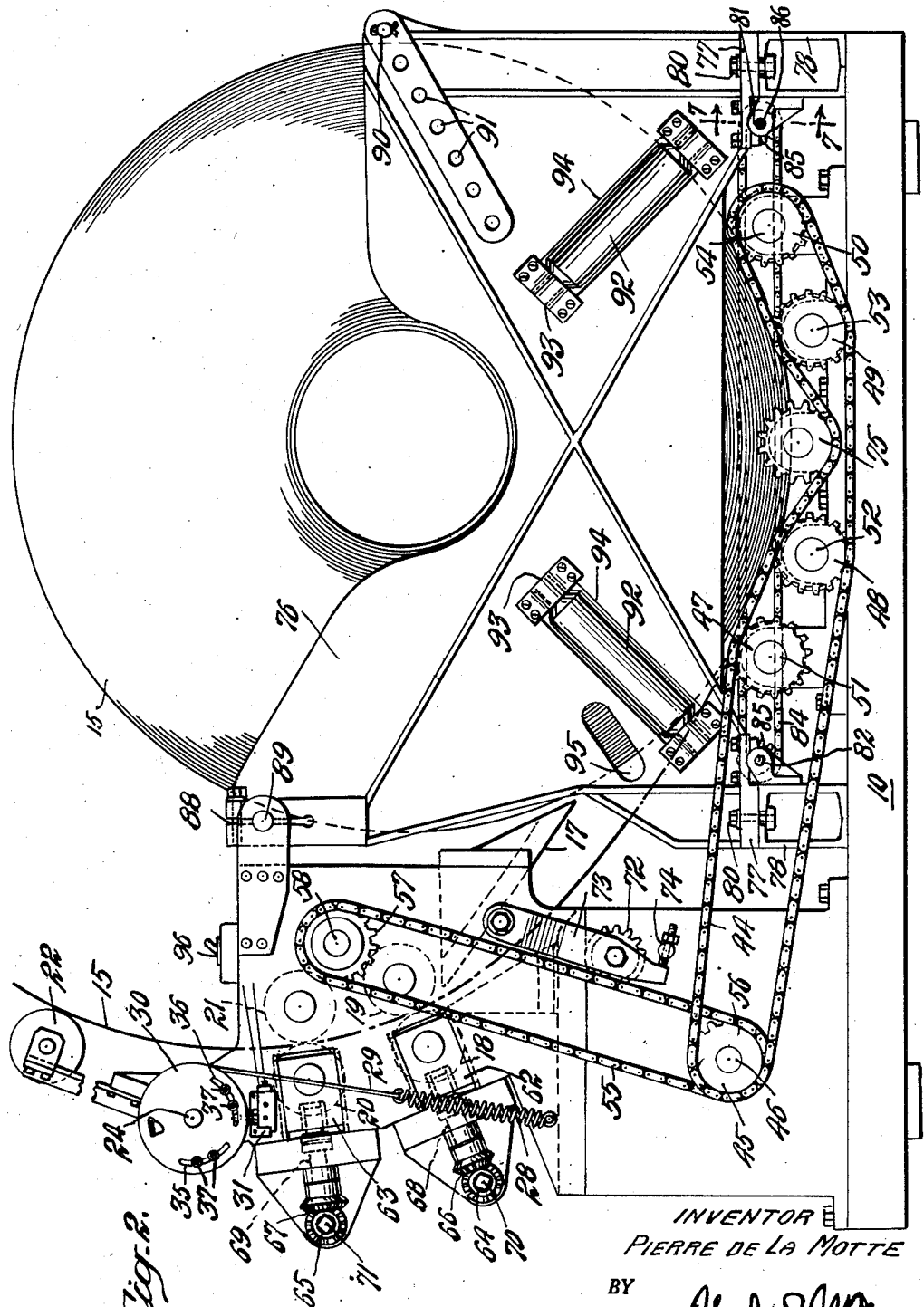
Fig. 2 is an enlarged broken side elevation of the coil cradle.

Figs. 5 and 6 are broken detail views illustrating opposite ends of the loop control, Fig. 5 showing the cable element looped over the inner side of the pulley to which it is attached for holding the feeler against the outer side of the loop of stock being fed as distinguished from the showing in Fig. 1, where the cable is looped over the outer side of the pulley for holding the feeler against the inside of the loop of stock;

Figs. 7 and 8 are broken sectional detail views of the side frame adjusting mechanism, Fig. 1 appearing as on substantially the plane of line 7—7 in Figs. 2 and 8, and Fig. 8 appearing as on substantially the plane of line 8—8 of Fig. 7.

In Fig. 1 the cradle is shown as comprising a base 10 carrying four power driven rest rolls 11, 12, 13, 14 for supporting the heavy coil of wide stock 15 and convergently arranged guides 16, 17 for leading off the outer convolution from the bottom of the coil to the lower and upper pairs of pinch rolls 18, 19 and 20, 21, respectively.

Figure 3:
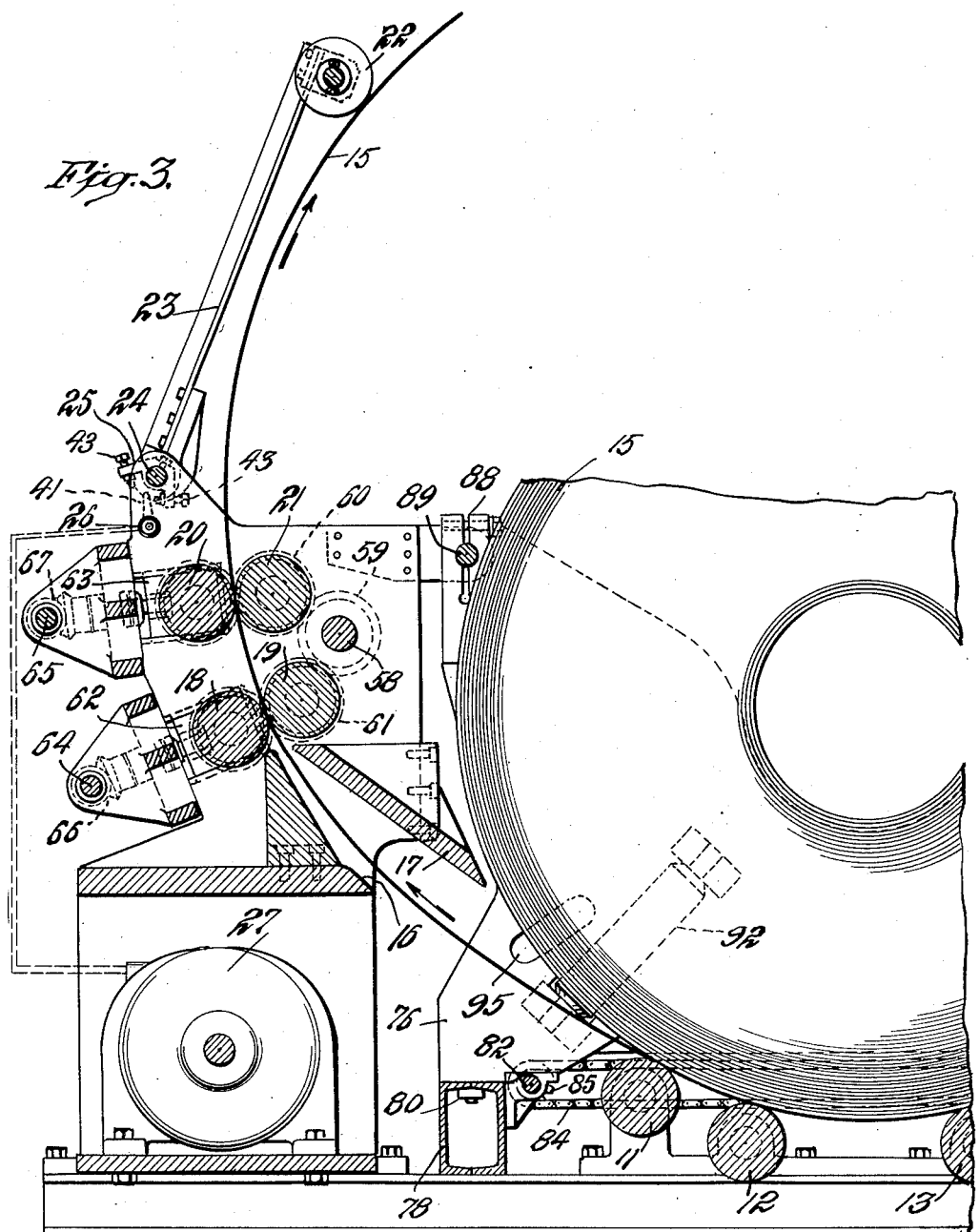
Fig. 3 is a further enlarged broken vertical sectional view showing particularly the power driven rest rolls, the fixed stock guides, the two pairs of take-out or pinch rolls and the loop control.
Figure 4:
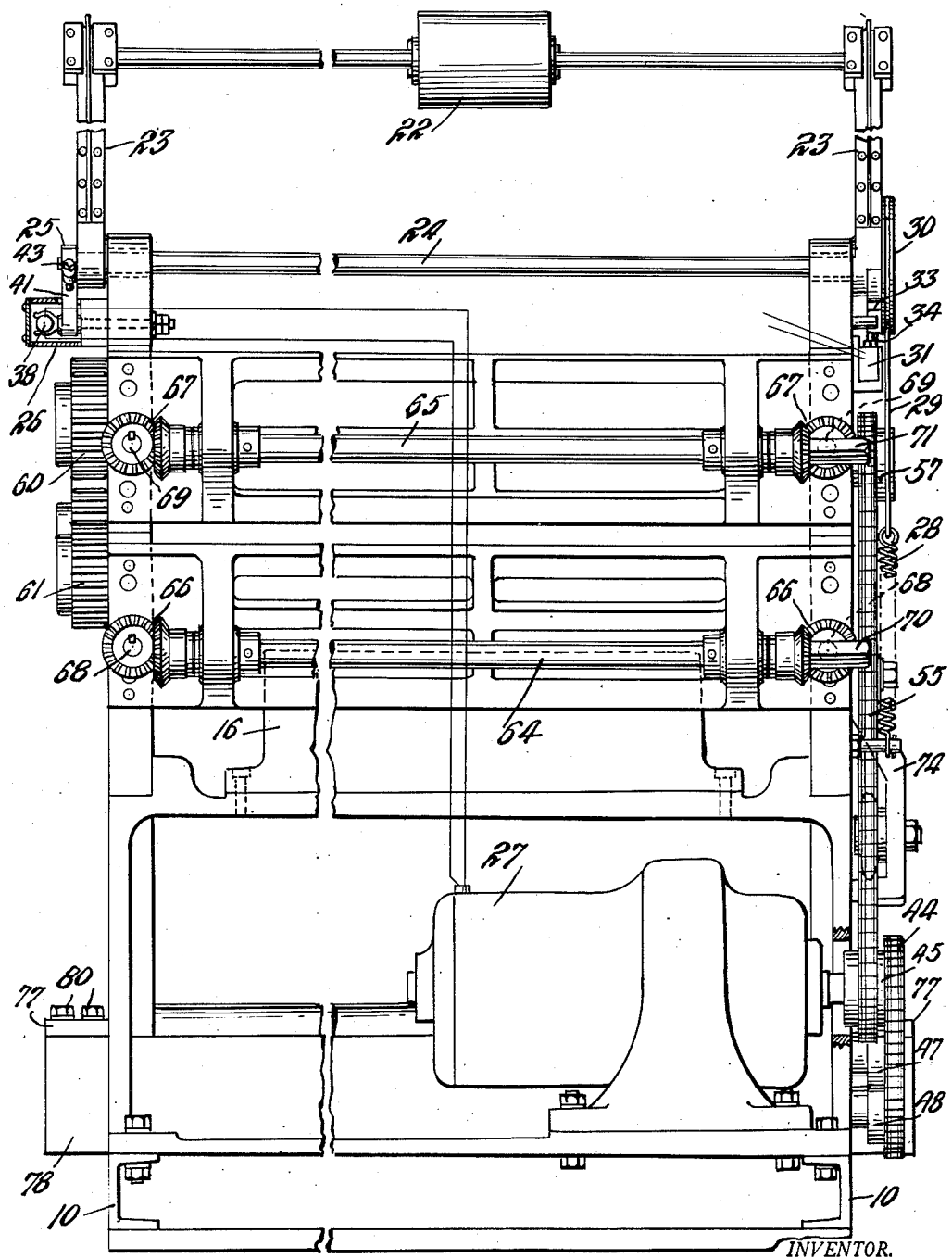
Fig. 4 is a broken end elevation looking at the left-hand, power end of the machine.

Above the upper pair of pinch rolls 20, 21 the stock forms in a loop and the size of this loop governs feeding action through the medium of a roller 22 riding either the inside or the outside of the loop, said roller carried by an arm 23 fixed on rock shaft 24 carrying a yoke 25, Fig. 4, to operate toggle switch 26, Fig. 3, usually of the mercury type, to start and stop the motor 27 which drives the rest rolls and take-out rolls.

The control arm 23 is tensioned toward the loop, in the illustration, by a spring 28 connected by cable 29 to a pulley 30 fixed on shaft 24. The cable is reversible to opposite sides of the pulley so that the pull may be applied to tension the feeler roll 22 against the inside of the loop for thin stock, as shown in Fig. 1, or against the outside for heavier stock, as illustrated in Figs. 2, 5 and 6.

The tension applying pulley 30 is utilized in the present disclosure for the further purpose of actuating a switch such as shown at 31 to stop the machine which the cradle is feeding if the loop should for any reason become too small.

This is a safety feature to protect the cradle and related machine against possible injury which might otherwise result from failure of the cradle to feed sufficient stock to a preceding machine.

In the illustration, Fig. 1, the cradle is shown feeding stock to a power driven straightener 32 of special design intended to feed wide strip stock directly into a power press or other metal shaping or forming machine. In this particular arrangement parts are adjusted so that the safety switch 31 will stop the power driven straightener 32 any time the supply loop advanced by the cradle becomes less than a predetermined safety slack amount.

Adjustment of this control may be effected in the illustration by setting the switch actuating trip fingers 33, 34, Fig. 5, on the inner face of the control pulley 30 at different points in the length of arcuate slots 35, 36 in the pulley, the fingers being secured in adjusted position by bolts 37.

As the control shaft turns right-handedly under pull of the lessening loop of stock in Fig. 1, or is pulled in a right-handed direction by spring 28 against the lessening loop of stock, Figs. 2 and 5, the right-handed finger 34 will trip the switch 31 to stop the straightener or other machine to which the cradle is feeding.

Conversely, as the loop of stock advanced by the cradle reaches a proper working size, the control shaft turning in left-handed direction will cause the left-hand finger 33 to close the switch 31 and arm the circuit for the straightener or advance machine.

Consequently this control assures that the stock straightener or other machine supplied by the coil cradle will be stopped when the supply loop advanced by the cradle is insufficient, and will be started or its circuit put in running condition when the supply loop is of proper proportions to meet the needs of the machine.

To change the control from light, thin stock to heavy, thick stock it is only necessary to shift the feeler roll from the inside to the outside of the stock loop and to swing the cable 29 from its position over the outer side of the pulley, Fig. 1, to reverse position over the inner side of the pulley, as in Fig. 5. This reverses the pull of the spring on the control shaft. To change from heavy to light stock, that is, from the Fig. 5 to the Fig. 1 relation, the procedure is reversed, but in each case the switch 31 is thrown to stop the preceding machine when the cradle loop becomes too small, and to start or continue the preceding machine in operation when the supply loop is of proper operating size.

The switch 26 which controls the cradle drive motor is shown in Fig. 6 as a mercury switch having a mercury cell tube 38 reversibly engageable in a spring clip 39 mounted to rock about a supporting center 40 and having a projecting toggle lever 41 engageable by bolts 42, 43 adjustable in opposite ends of the rocking yoke 25.

Adjustment of screws 42 and 43 will determine starting and stopping of the cradle drive motor, according to size of supply loop desired to be maintained, the rocking of the control arm toward the coil serving to close the switch to start the motor, and rocking movement of this arm away from the coil operating the switch in the opposite direction to stop the motor.

Both the rest rolls and the pinch rolls are shown driven from the same motor, the rest rolls by a single continuous chain 44, Figs. 1 and 2, extending from a sprocket 45 on the end of motor driven shaft 46 over sprockets 47, 48, 49 and 50 on the ends of the rest roll shafts 51, 52, 53 and 54, and the pinch rolls by a chain 55 running from sprocket 56 on power shaft 46, over sprocket 57 on shaft 58, carrying gear 59, Fig. 3, in mesh with gears 60, 61 on the shafts of inner pinch rolls 19 and 21.

The outer rolls 18 and 20 of the lower and upper pairs of pinch rolls are shown mounted in slidably adjustable bearing boxes 62, 63 which can be set to vary the bite of the rolls by means of cross shafts 64, 65, shown in Fig. 4 as geared at opposite ends at 66, 66 and 67, 67, respectively, to screw shafts 68, 68 and 69, 69 connected with the slidable journal boxes.

The pinch or grip adjusting shafts 64, 65 are shown as having square ends 70, 71 for a crank or wrench. By means of this construction the upper and lower pairs of pinch rolls may be set to the same or to different degrees of grip to suit the material and the requirements of the cradle and associated machines.

The upper pair of pinch rolls may be of slightly larger diameter or geared to rotate at slightly greater surface speed than the lower pair, thus to surely aid in feeding the stock and to add actual take-out force to the effort of the first or lower pair of pinch rolls.

The sprocket chain 55 driving the pinch rolls is shown as engaged at one side by a tightener sprocket 72 carried by a swinging link 73 pivoted at one end and adjustably held toward the chain at the opposite end by a set-screw 74.

The longer chain, 44, driving the four rest rolls is shown tensioned at the center between the innermost rolls 52, 53 by an idler sprocket 75 bearing on the span of chain between the inner sprockets 48 and 49.

The coil is maintained in alignment in the cradle between spaced side frames 76 having base portions 77 supported on cross sills 78 slotted at 79 to take the securing bolts 80, Figs. 7 and 8.

Simultaneous lateral adjustment of the side frames is effected in the illustration by screw shafts 81, 82 journaled on the base at opposite ends of the side frames and engaged by the nut elements 83 dependent from these frames. Opposite ends of the shafts are reversely screw threaded and the nuts correspond so that with reverse rotation of these screw shafts the side frames will be positively drawn together or forced apart. Simultaneous rotation of the two shafts is effected by a chain 84 connecting sprockets 85 on the ends of the shafts, and one shaft is shown as having a square end 86 engageable by a hand crank 87, Fig. 7. It will be evident from this that upon loosening the bolts 80 securing the side frames down on the base, these side frames may be relatively separated or brought together by simply turning a hand crank 87 or wrench applied to the end of shaft 81.

In addition to securing bolts 80, the side frames may be held at their upper, inner ends by split clamps 88 secured over a transverse stay-rod 89, Fig. 2.

Additionally, the upper, outer ends of the side frames may be braced by a transverse stay or guard rod 90 engageable through openings 91 in the side frames, according to size of coil seated in the cradle.

To apply a positive guiding effect without introducing objectionable friction, the side frames are shown as carrying guide rolls 92 journaled in bearings 93 on the outer sides of the frames, substantially radially of the coil axis and projecting through slots 94 in the frames, into rubbing or rolling engagement with the sides of the coil. By adjustment of the side frames toward each other these rolls may be brought into guiding and centering engagement with the sides of the coil.

The side frames are shown provided with substantially radial slots 95 providing access to the outer convolutions of the coil for a pinch bar or other such tool for prying loose the outer layer of material which, particularly in heavier stock, may have a tendency to cling to the body of the coil.

These slots in the side frames are located relatively close to the convergent strip guides 16, 17 so that as the outer end of the stock is pried away from the coil the cradle may be rotated slightly to direct the end of the material in between the guides and into the reach of the first pair of pinch rolls.

These inching operations are facilitated in the illustration by means of a reversing switch 96 connected to control the motor 27, located in a convenient position on the base and operable by hand to start and stop and operate the motor to rotate the coil either in a forward feeding or reverse direction.

By supporting the coil on four rest rolls, two at opposite sides of bottom dead center and two others slightly higher at the outer sides of the bottom rolls with their contact faces on an arc approximating that of the coil and driving all four of these rolls, the machine is capable of handling heavy rolls of wide stock without distorting, abrading or otherwise affecting the material.

The two pairs of pinch rolls is another feature in the successful handling of the wide strip material. Each pair is set to take firm hold, and with the second pair rotating at slightly greater surface speed one pair will assist the other and any buckling of stock between the two pairs of rolls will be avoided.

The simultaneous adjustment of the two side frames facilitates centering and guiding the coil and undue rubbing friction is avoided by provision of the guide rolls in the confining portions of the side frames.

Use of the reversing switch 96 enables one man to rotate the coil one way or the other as much as need be to inch the stock into place, and the pinch bar openings 95 in the sides of the frames provides access to and inspection of the outer convolution in separating it from the body of the coil and starting it through the guides to the take-out rolls.

The single chain drive connection from the motor to all four rest rolls and the single chain drive connection from the motor to the two pairs of pinch rolls, provide simple, direct drive means which will maintain synchronous operation of parts at all times.

The reversing switch may be used as a supervisory control to stop the machine at any time, in addition to its primary use for inching purposes. The safety switch which operates to stop the preceding machine when the supply loop reaches dangerous small proportions, is important in protecting both machines, that is, the machine supplied as well as the coil cradle which is supplying the machine.

The parts are all arranged and associated in a compact design with all features contributing to the smooth, expeditious and successful handling of the wide, heavy coil stock.

What is claimed is:

1. A power cradle for heavy coil stock comprising a base, rest rolls for a coil of stock journaled in the base with their contacting faces on an arc approximating that of a supported coil and arranged two at opposite sides of bottom dead center and two others at higher level at the outer sides of the two lower rolls, coil confining side frames laterally shiftable on the base, guides for directing the stock upwardly from the bottom of the coil, two pairs of successively disposed pinch rolls above said guides and power drive means on the base extending to said rest rolls and pinch rolls, including gearing for driving the second pair of pinch rolls at greater surface speed than the first pair and means for independently adjusting the grip of the two pairs of pinch rolls on the stock for enabling one pair of rolls to assist the other pair in withdrawing stock from the coil.

2. A power driven coil cradle comprising rest rolls, side frames for confining a coil on said rest rolls, pinch rolls for withdrawing stock from the bottom of the supported coil, a motor, drive connections from said motor to said rest rolls and pinch rolls, a control switch for starting and stopping said motor, a rock shaft having means for operating said switch, an arm projecting from said shaft, a feeler roller carried by said arm for engagement inside or outside a loop of stock advanced by the take-out rolls, a pulley on said shaft and a spring tensioned cable engageable in reverse relation over one or the other side of said pulley for tensioning the feeler roller against either the inside or the outside of a loop of stock.

References Cited in the file of this patent
UNITED STATES PATENTS

| | | |
|---|---|---|
| 1,972,851 | McCarthy | Sept. 4, 1934 |
| 2,020,889 | Hofer | Nov. 12, 1935 |
| 2,070,444 | Mikaelson et al. | Feb. 9, 1937 |
| 2,203,354 | Harrington et al. | June 4, 1940 |
| 2,207,663 | Glasner | July 9, 1940 |
| 2,273,274 | Krouse | Feb. 17, 1942 |
| 2,394,824 | Todd | Feb. 12, 1946 |
| 2,692,737 | Rowe | Oct. 26, 1954 |